Patented Oct. 27, 1953

2,657,238

UNITED STATES PATENT OFFICE 2,657,238

CATALYZED REACTIONS BETWEEN HYDROGEN SULFIDE OR DIMERCAPTANS AND DIALKENYL ETHERS OR POLYALKENYL AMINES

William E. Vaughan, Berkeley, and Denham Harman, Menlo Park, Calif., assignors to Shell Development Company, San Francisco, Calif., a corporation of Delaware No Drawing. Application June 22, 1950, Serial No. 169,772

14 Claims. (Cl. 260—583)

This invention relates to a method for the preparation of novel lubricating compositions by the base-catalyzed reaction of hydrogen sulfide or a dimercaptan with an olefinic compound. This application is a continuation-in-part of application Serial No. 708,194, filed November 6, 1946, and now abandoned.

It is an object of the present invention to provide a novel method for the production of a non-hydrocarbon lubricant. It is another object of the present invention to provide a novel method for the preparation of a lubricant useful at low temperatures. It is still another object of this invention to provide a novel method for the preparation of a lubricant possessing inherent extreme pressure properties. Other objects will become evident from the following disclosure.

The present invention is based on the discovery that superior lubricating compositions useful at low temperatures and possessing inherent extreme pressure properties may be obtained by reacting hydrogen sulfide or a dimercaptan with a dialkenyl ether (which term includes oxy- as well as thioethers) or a polyalkenyl amine in the presence of a basic catalyst.

The alkenyl reactants of the present invention are those having the general formula R—X—R wherein the R's represent alkenyl radicals (which term is employed herein to include both substituted as well as unsubstituted alkenyl radicals), while X represents —O—, —S—, or

$R_1$ being a hydrogen atom or an alkyl, alkenyl, or other monovalent organic radical. Preferably, $R_1$ represents a hydrogen atom. Representative (oxy) ether reactants are divinyl ether, diisopropenyl ether, diallyl ether, dicrotyl ether, dimethallyl ether, di(alpha-methyl-allyl) ether, (1-butene-3-yl) (2-butene-4-yl) ether, the dihexenyl ethers, allyl (2-methyl-4-pentene-2-yl) ether and allyl linalyl ether, as well as the substituted derivatives of such ethers as, for example, di(chloroallyl) ether, chloroallyl methallyl ether, and the like. Representative thioethers which are useful in the process of the invention are, for example, divinyl sulfide, diallyl sulfide, dicrotyl sulfide, dimethallyl sulfide, and the dihexenyl sulfides, as well as substituted thioethers such as di-(beta-chlorovinyl) thioether. Representative polyalkenyl amines which may be usefully employed in the process of the invention are divinyl amine, diallyl amine, dimethallyl amine, dicrotyl amine, diisopropenyl amine, methyl diallyl amine, triallyl amine, methyl allyl methallyl amine, dioctyl amine, as well as substituted polyalkenyl amines, such as di-(beta-chlorovinyl) amine, chloromethyl diallyl amine and the like.

A particularly suitable and preferred group of olefinic reactants comprises those compounds containing olefinic linkages in the alpha and omega positions (i. e., in the terminal positions) of the molecule. Numerous examples of such compounds, including the divinyl, diallyl and dimethallyl ethers and amines, are given in the foregoing paragraph and need not be repeated here.

The sulfur-containing reactant of the present invention is represented by hydrogen sulfide or by a dimercaptan. One class of suitable dimercaptan reactants is made up of the polymethylene dimercaptans of the general formula $HS—(CH_2)_n—HS$, wherein $n$ is any integer of from 1 to about 16. In the majority of cases, it is preferable to employ the normal or isoalkyl chain mercaptans having terminal thio groups, particularly those which are contained in or derived from petroleum or petroleum products. Representative dimercaptan reactants are: 1,2-ethanedithiol, 1,2-propanedithiol, 1,4-butanedithiol, 1,8-octanedithiol, 1,16-hexadecanedithiol, 1,3-dithiol-2-methylpropane, 1,5-dithiol-2-methyl-3-chloropentane, 1,4-hexanedithiol, and 1,3-pentanedithiol.

The catalysts employed in the present invention are basic substances which may be either inorganic or organic. The alkali metal oxides, amides, carbonates and hydroxides, such as sodium, potassium and lithium hydroxides, are suitable. Likewise, the alkaline earth metal oxides, amides, carbonates and hydroxides such as barium, calcium, and aluminum hydroxides may be used.

Another group of catalysts which are useful in the formation of adducts containing lubricating fractions have the general formula

wherein $R_1$, $R_2$, and $R_3$ are substituents such as hydrogen, hydroxyl, alkoxyl, alkenyl, aroxyl, aralkyloxyl, alkaryloxyl, alkyl, aryl, aminoaryl, aralkyl, alkylamino, alkaryl, etc. These include ammonia, primary amines, secondary amines and tertiary amines.

Primary amine catalysts having the general formula

include hydroxylamine and alkylamines, especially alkylamines wherein the alkyl group contains less than thirteen carbon atoms. These include methylamine, ethylamine, propylamine, isopropylamine, butylamine, amylamine, hexylamine, heptylamine, octylamine, nonylamine, decylamine, dodecylamine, ethylenediamine, and their homologs and analogs. Other groups of useful primary amines are the aryl amines, such as phenylamine, and naphthylamine, and substituted aryl amines, including the alkarylamines. Examples of such compounds are ortho-toluidine, meta-toluidine, para-toluidine, ortho-ethylaniline, meta-ethylaniline, and para-ethylaniline. Other primary aromatic amines include ortho-phenylenediamine, meta-phenylenediamine, para-phenylenediamine as well as substituted phenylenediamines such as methyl-para-phenylenediamine, ethyl-para-phenylenediamine, etc.

Secondary amines suitable for catalyzing the formation of the subject lubricants include dialkylamines containing similar or different alkyl groups, such as dimethylamine, diethylamine, dipropylamine, diisopropylamine, and ethylamylamine, as well as their homologs and analogs. It is preferred, when using dialkylamines as catalysts, that the alkyl substituents be similar alkyl groups, each containing less than about ten carbon atoms. Other secondary amines which act as suitable catalysts include the diarylamines, such as diphenylamine, dinaphthylamine, and phenylnaphthylamine and substituted diarylamines such as 4,4'-dimethyldiphenylamine, 4,4'-dihydroxydiphenylamine, etc. Mixed aromatic aliphatic secondary amines are suitable catalysts. These include amines containing a phenyl substituent and a lower alkyl substituent, for example, such as phenylmethylamine.

Tertiary amines likewise act as catalysts for the preparation of adducts from which the subject lubricants are derived. The outstanding members of this group are trialkylamines, such as trimethylamine, triethylamine, triisopropylamine, tributylamines, etc. Other suitable catalysts are the quaternary ammonium bases.

A preferred group of basic catalysts for the purpose of the present invention is made up of the aliphatic amines and the alkali metal hydroxides.

In the preparation of the adducts, the ratio of unsaturated compound to the hydrogen sulfide or mercaptan may vary within relatively wide limits, dependent upon the product desired and the other conditions employed. Preferably, the molar ratio of unsaturate to hydrogen sulfide or mercaptan is from 0.5 to about 2.5 and optimum results usually are obtained when the molar ratio is about 1.

The molar ratio of catalyst likewise may vary, but it is preferred that the catalyst be present in amounts from about 1 mol percent to about 10 mol percent based on the total mols of unsaturate and hydrogen sulfide or mercaptan, and, under the best conditions for operation, from about 2 to about 5 mol percent is employed.

When operating in an open system, this ratio of catalysts to reactants may be substantially different, since the reactants may, for example, be bubbled in gaseous form through a large excess of an amine, which would be either in liquid form or in solution. Again, if the reaction is conducted entirely in the gaseous phase, the reactants being recycled at a relatively rapid rate through a heated reaction zone, the catalyst concentration may be higher than about 10 mol percent in order to promote maximum formation of the adduct during each cycle.

The reaction may be carried out in a closed system, such as in an autoclave, or the system may be an open one, the reactants being recycled either continuously or batch-wise to the reaction zone.

The adducts are readily formed at a rate convenient for accurate control if the temperature of the reaction zone is from about 70° C. to about 200° C., and usually 90–150° C. is the preferred range. Lower temperatures may be employed if the concentration of base catalyst and/or the reaction time are increased.

Preferably, the reaction is allowed to continue for 5 to 80 hours, dependent upon the conditions employed. Usually a period of 10 to 50 hours allows the preparation of a product having a large lubricating fraction.

Diluents may be employed during the adduct formation, the diluent being either a gas or liquid, preferably substantially inert to the catalyst or any of the reactants, although maximum reaction rates and lubricant recovery efficiency are ordinarily obtained in the absence of diluents. The diluent, if used, may act as a solvent for one or more of the reaction components, as a medium for the adduct formation, as a solvent for the lubricant fraction of the adduct, or as a refluxing agent for the control of reaction temperature.

Although the reaction usually is carried out in a single liquid phase, it may be conducted in an emulsion system or in gaseous phase as well.

An essential feature of the present invention is the substantially complete removal of the volatile components of the adduct. Since the adduct reaction usually results in the formation of a mixture of products, this relatively volatile fraction will vary, dependent upon the conditions under which the adduct is formed. The catalyst employed will have a great effect upon the proportion of relatively volatile components in the product.

When basic substances are used to catalyze the formation of the adduct, it has been found in accordance with this invention, that the proportion of fractions having lubricating properties is unusually high, as compared with the yield obtained when other catalysts are employed.

The fraction of relatively volatile constituents removed will depend upon the lubricating purpose for which the remainder will be employed. If no fraction is removed, the composite adduct is generally useless as a lubricant, since the lighter fractions will inevitably volatilize during operation to a greater or lesser degree dependent upon conditions to which the adduct is subjected.

It has been found that by removing the fraction volatilizing below about 100° C. at 5 cm. mercury pressure there is obtained a residue having utility for general lubricating purposes, although to obtain a lubricant having optimum properties it is necessary to remove the fraction volatilizing below about 160° C. at 0.2 cm. mercury pressure.

The lubricant so obtained may be further treated in order to improve color, alter terminal groups, increase molecular weight, etc., if desired.

The adducts formed by the above reaction may contain sulfhydryl, or mercapto groups attached to one of the carbon atoms initially having an unsaturated linkage.

When ethers or thioethers having unsaturated linkages in both radicals attached to the ether oxygen or sulfur atom, or to the amino nitrogen atom are treated with hydrogen sulfide or a dimercaptan as described hereinbefore, the adducts are polymeric compounds having units of the general configuration,

—S—R—X—R— wherein X is either —S—, —O— or

$R_1$ being a hydrogen atom or an alkyl, alkenyl or other monovalent organic radical, and each R is an organic radical, preferably a saturated hydrocarbon radical.

The addition reaction of the present invention proceeds in accordance with the Markownikoff rule and therefore results in the formation of compounds having a branched hydrocarbon chain attached directly to the sulfur atom. Thus, when the adduct is one formed between hydrogen sulfide and diallyl ether, the principal product of the reaction is a mixture of polymers having units of the general formula:

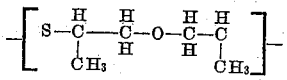

When an unsaturated thioether or amine is treated with hydrogen sulfide, polymers are produced having a formula which correspond to that above, except that the oxygen atoms are replaced by sulfur or nitrogen atoms, as the case may be.

The method of the present invention is particularly useful in the preparation of lubricants since the use of basic catalysts enables the production of reaction mixtures a large fraction of which possesses lubricating properties. The adducts making up such lubricant fraction are stable to oxidation and respond well to treatment with antioxidants such as 1,2-dihydroxybenzene, for example. They have low pour points (usually lower than —30° F.) and exhibit exceptionally good extreme pressure characteristics.

*Example I*

Thirty parts hydrogen sulfide, 73.6 parts diallyl ether and 10 parts di-normal-butylamine were heated together at 100° C. for 89 hours in an autoclave. The viscous, water-white product was then heated at 240° C. under 0.2 cm. mercury pressure in order to remove volatile constituents. The product had the viscosity characteristics of an SAE 70 oil, a viscosity index of 140 and a pour point of —50° F.

The process described in the preceding paragraph was then repeated using 9 parts of diallyl amine instead of the 10 parts of di-n-butylamine as catalyst, the reactants being heated for 45 hours at 100° C. in the bomb. The characteristics of the lubricant fraction so produced were essentially the same as those described above. Likewise, in another operation wherein the amine catalyst is replaced by an equivalent amount of sodium hydroxide, again with a heating period of approximately 45 hours at 100° C., substantially the same lubricant product is obtained.

*Example II*

Dimethallyl ether (94 parts) hydrogen sulfide (30 parts) and n-butylamine (3.7 parts) were heated together in a bomb for 23 hours at 110° C., following which the reaction mixture was heated to about 240° C. at 0.2 cm. mercury pressure to remove volatile constituents. The viscous bottoms remaining in the still had a refractive index ($n$ 20/D) of 1.4973 and manifested good lubricant properties.

*Example III*

Diallyl amine (79 parts) and hydrogen sulfide (30 parts) were heated together at 115° C. for 20 hours in a bomb, the diallyl amine reactant also serving to catalyze the reaction. The somewhat viscous, amber-colored liquid product was filtered and then topped in a Claisen flask to a kettle temperature of 210° C. at a pressure of 18 cm. mercury. The residue, a dark, amber-colored viscous liquid, was then redistilled to remove still further volatile constituents, leaving a viscous residue boiling above 210° C. at 0.2 cm. mercury pressure. The latter residue, in addition to having good lubricant qualities, also forms a useful asphalt-bonding additive.

*Example IV*

Using the same procedure as outlined in the foregoing example, there were reacted 79 parts dimethallyl amine and 28 parts of hydrogen sulfide. Here again, the residue boiling above 210° C. at 0.2 cm. mercury pressure was found to have good lubricant qualities.

*Example V*

Following the procedure outlined in Example I, there is obtained a fraction boiling above 200° C. at 0.2 cm. mercury pressure by reacting 85.5 parts diallyl thioether with 30 parts hydrogen sulfide in the presence of 10 parts di-n-butylamine. This fraction has a low pour point and makes an excellent lubricant which can be used at temperatures well below freezing.

*Example VI*

Following the procedure outline in Example I, a liquid having good lubricant qualities at low temperatures is obtained by reacting 73.6 parts diallyl ether, 82.7 parts 1,2-ethanedithiol and 10 parts di-n-butylamine. The non-volatile portion of the reaction product, which boils above 170° C. at 0.2 cm. mercury pressure, has good lubricant properties. A somewhat higher boiling residue, which also manifests good lubricant qualities, is obtained by conducting the foregoing reaction with an equivalent amount of 1,16-hexadecanedithiol instead of the 1,2-ethanedithiol.

The invention claimed is:

1. The process which comprises heating diallyl ether and hydrogen sulfide in the presence of from 1 to 10 mol per cent of di-n-butylamine and removing from the product so formed the fraction thereof volatilizing below about 100° C. at 5 cm. mercury pressure.

2. The process which comprises heating diallyl ether and hydrogen sulfide in the presence of 1 to 10 mol per cent of an aliphatic amine and removing from the product so formed the fraction thereof volatilizing below about 100° C. at 5 cm. mercury pressure.

3. The process which comprises heating diallyl ether and hydrogen sulfide in the presence of 1 to 10 mol per cent of an alkyl amine bearing an alkyl group having less than 13 carbon atoms and removing from the product so formed the fraction thereof volatilizing below about 100° C. at 5 cm. mercury pressure.

4. The process which comprises heating diallyl ether and hydrogen sulfide in the presence of 1 to 10 mol per cent of a dialkyl amine, wherein the alkyl radicals each contain less than 10 carbon atoms, and removing from the product so formed the fraction thereof volatilizing below about 100° C. at 5 cm. mercury pressure.

5. The process which comprises heating diallyl ether and hydrogen sulfide in the presence of from 2 to 5 mol per cent of di-n-butylamine and removing from the product so formed the fraction thereof volatilizing below about 100° C. at 5 cm. mercury pressure.

6. The process which comprises heating dimethallyl ether and hydrogen sulfide in the presence of 1 to 10% of an aliphatic amine and removing from the product so formed the fraction thereof volatilizing below about 100° C. at 5 cm. mercury pressure.

7. The process which comprises heating diallyl amine and hydrogen sulfide and removing from the product so formed the fraction thereof volatilizing below about 100° C. at 5 cm. mercury pressure, the diallyl amine in said process acting both as a reactant as well as a catalyst for the reaction.

8. The process which comprises heating dimethallyl amine and hydrogen sulfide and removing from the product so formed the fraction thereof volatilizing below about 100° C. at 5 cm. mercury pressure, the diallyl amine in said process acting both as a reactant as well as a catalyst for the reaction.

9. The process which comprises heating a dialkenyl ether and hydrogen sulfide in the presence of from 1 to 10 mol per cent of an aliphatic amine and removing from the product so formed the fraction thereof volatilizing below 100° C. at 5 cm. mercury pressure.

10. The process which comprises heating a dialkenyl ether and hydrogen sulfide in the presence of from 1 to 10 mol per cent of a basic catalyst and removing from the product so formed the fraction thereof volatilizing below 100° C. at 5 cm. mercury pressure.

11. The process which comprises heating a dialkenyl ether and an aliphatic dimercaptan in the presence of from 1 to 10 mol per cent of an aliphatic amine and removing from the product so formed the fraction thereof volatilizing below about 100° C. at 5 cm. mercury pressure.

12. The process which comprises heating a dialkenyl ether and an aliphatic dimercaptan in the presence of from 1 to 10 mol per cent of a basic catalyst and removing from the product so formed the fraction thereof volatilizing below about 100° C. at 5 cm. mercury pressure.

13. The process which comprises heating a compound having the formula R—X—R with a compound selected from the group consisting of hydrogen sulfide and the aliphatic dimercaptans in the presence of from 1 to 10 mol per cent of an aliphatic amine and removing from the product so formed a fraction thereof volatilizing below about 100° C. at 5 cm. mercury pressure, the R's in said formula representing alkenyl radicals and the X representing a member selected from the group consisting of —O—, —S—, and

wherein $R_1$ is selected from the group consisting of the hydrogen atom and the monovalent organic radicals.

14. The process which comprises heating a compound having the formula R—X—R with a compound selected from the group consisting of hydrogen sulfide and the alphatic dimercaptans in the presence of from 1 to 10 mol per cent of a basic catalyst and removing from the product so formed a fraction thereof volatilizing below about 100° C. at 5 cm. mercury pressure, the R's in said formula representing alkenyl radicals and the X representing a member selected from the group consisting of —O—, —S—, and

wherein $R_1$ is selected from the group consisting of the hydrogen atom and the monovalent organic radicals.

WILLIAM E. VAUGHAN.
DENHAM HARMAN.

References Cited in the file of this patent
UNITED STATES PATENTS

| Number | Name | Date |
|---|---|---|
| 2,517,564 | Harman et al. | Aug. 8, 1950 |
| 2,562,844 | Harman et al. | July 31, 1951 |

OTHER REFERENCES

Gabriel et al., Ber. Deut. Chem., vol. 30, page 2497 (1897).